United States Patent
Zucker

(10) Patent No.: US 6,869,726 B2
(45) Date of Patent: Mar. 22, 2005

(54) REINFORCED MULTILAYER SEPARATOR FOR LEAD-ACID BATTERIES

(75) Inventor: Jerry Zucker, Charleston, SC (US)

(73) Assignee: Daramic, Inc., North Charleston, SC (US)

( * ) Notice: Subject to any disclaimer, the term of this patent is extended or adjusted under 35 U.S.C. 154(b) by 0 days.

(21) Appl. No.: 10/075,167

(22) Filed: Feb. 14, 2002

(65) Prior Publication Data

US 2003/0054233 A1 Mar. 20, 2003

Related U.S. Application Data

(63) Continuation-in-part of application No. 09/957,602, filed on Sep. 20, 2001.

(51) Int. Cl.[7] .......................... H01M 2/16; C25B 13/00
(52) U.S. Cl. ...................... 429/144; 429/145; 429/251; 204/295
(58) Field of Search ................. 429/144, 145, 429/142, 254, 247, 251, 248; 428/297.1, 316.6; 204/297.11, 295

(56) References Cited

U.S. PATENT DOCUMENTS

| | | | |
|---|---|---|---|
| 3,558,764 A | 1/1971 | Isaaeson et al. | 264/210 |
| 3,679,538 A | 7/1972 | Druin et al. | 161/159 |
| 3,801,404 A | 4/1974 | Druin et al. | 156/229 |
| 3,839,240 A | 10/1974 | Zimmerman | 260/2.5 HA |
| 4,363,856 A * | 12/1982 | Waterhouse | 429/143 |
| 4,620,956 A | 11/1986 | Hamer | 264/145 |
| 4,725,516 A * | 2/1988 | Okada et al. | 429/225 |
| 4,908,282 A | 3/1990 | Badger | 429/59 |
| 5,376,477 A * | 12/1994 | Aidman et al. | 429/141 |
| 5,478,677 A | 12/1995 | Choi et al. | 429/249 |
| 5,747,188 A * | 5/1998 | Von Sacken et al. | 429/61 |
| 5,962,161 A | 10/1999 | Zucker | 429/142 |
| 2002/0106557 A1 * | 8/2002 | Fraser-Bell et al. | 429/145 |
| 2003/0054232 A1 * | 3/2003 | Zucker | 429/144 |
| 2004/0048152 A1 * | 3/2004 | Yata et al. | 429/162 |

FOREIGN PATENT DOCUMENTS

| | | | | |
|---|---|---|---|---|
| JP | 55-16364 | | 2/1980 | |
| JP | 55-24330 | | 2/1980 | |
| JP | 55-024330 | * | 2/1980 | ............ H01M/2/16 |
| JP | 11-167910 | * | 6/1999 | ............ H01M/2/16 |

OTHER PUBLICATIONS

Copy of the International Search Report dated May 23, 2003.

"All you ever really wanted to know about separators"; Bob Nelson; Apr. 2000; VRLA Technology; 7–Pages.

"The multi layered approach for AGM Separators"; A.L. Ferriera; Hilton Atrium Hotel, Prague, Czech Republic; Sep. 22–25, 1998; Amer–Sil S.A.; 22–Pages.

"A review of the state of the art of the VRLA battery separator"; Final Report; Oct. 2000; M.J. Weighall et al.; R/S–001 MJW Associates; pp. I, 20–54.

"Handbook of Battery Materials"; Jurgen O. Besenhard (Ed.); pp.: 245–292, No date available.

* cited by examiner

Primary Examiner—Raymond Alejandro
(74) Attorney, Agent, or Firm—Nields & Lemack

(57) ABSTRACT

A battery separator comprising at least one fibrous layer and at least one support layer, wherein the support layer is formed of an acid-resistant material and comprises a plurality of macroscopic openings.

18 Claims, 1 Drawing Sheet

REINFORCED MULTILAYER SEPARATOR FOR LEAD-ACID BATTERIES

This application is a Continuation-In-Part of U.S. patent application Ser. No. 09/957,602 filed on Sep. 20, 2001, still pending.

FIELD OF THE INVENTION

This invention relates to novel porous separators for electric lead-acid storage batteries. According to another aspect the invention relates to lead-acid storage batteries comprising such a novel separator.

BACKGROUND OF THE INVENTION

Basically, battery separators serve as electronic insulators and ionic conductors, i.e. they prevent the direct electronic contact of electrodes of opposite polarity while enabling the ionic current between them. To meet these two functions, separators are usually porous insulators with pores as small as possible to prevent electronic short circuits by dendrites or plate particles and with a porosity as high as possible to minimize the internal battery resistance. In lead-acid batteries, the separator also determines the proper plate spacing and thereby defines the amount of electrolyte which participates in the cell reaction. The separator has to be stable over the life time of the battery, i.e. to withstand the highly aggressive electrolyte and oxidative environment.

Beyond these basically passive functions, separators in lead-acid batteries can also actively affect the battery performance in many ways. In valve regulated lead-acid (VRLA) batteries they additionally determine properties like oxygen transfer, electrolyte distribution and plate expansion. Due to their outstanding influence on the performance of VRLA batteries the separator is even referred to as the "third electrode" or "fourth active material" (Nelson B., Batteries International, April 2000, 51–60).

VRLA stands for valve-regulated lead-acid batteries which are also called sealed or recombinant batteries. In VRLA batteries oxygen, which is generated during charging at the positive electrode, is reduced at the negative electrode. Thus the battery can be charged and even be overcharged without water consumption and is therefore theoretically maintenance-free. The formation of hydrogen at the negative electrode is suppressed, for instance by using larger negative than positive plates in order to generate oxygen at the positive plate before the negative plate is fully charged.

For VRLA batteries two technologies are predominant, i.e. batteries with an absorptive glassmat (AGM) and gel batteries. In batteries with AGM, the absorptive glassmat immobilizes the electrolyte and simultaneously functions as a separator. In gel batteries, the acid is immobilized by means of fumed silica and an additional separator is required to fix the plate distance and to prevent electronic shorts. Compared to AGM batteries, the manufacturing cost of gel batteries is considered to be higher and their specific power is lower due to a higher internal resistance.

In AGM batteries the electrolyte is completely absorbed by the glass mat. AGM separators have a very high porosity in excess of 90%. This high porosity together with a good wettability is reflected in a very high acid absorption and low electrical resistance. In the battery, the acid saturation of AGM separators is usually in a range of 85 to 95%. This increases the effective electrical resistance versus fully saturated separators but creates open channels of relatively large pores that enable a very efficient oxygen transfer from the positive to the negative plate. The average pore size of AGM separators is usually within the range of 3 to 15 $\mu$m with an anisotropic distribution, i.e. pore sizes of about 0.5 to 5 $\mu$m in the x-y-plane of the separator which is the plane parallel to the electrode plates and pore sizes of about 10 to 25 $\mu$m in the z-direction perpendicular to the electrodes.

Due to the relatively large pores and the good wettability, the wicking rate (speed of acid pick-up) of AGM is fairly high which facilitates the filling process of batteries.

A severe disadvantage of AGM separators is their mechanical weakness which is due to the fact that pure glass separators do not contain binders of any type. The tensile strength of this material depends only on the fiber contacts and some entanglement. At the molecular level these contacts are believed to be of the hydrogen bonding type established between adjacent fibers. Since finer fibers have greater chances to establish these contacts, it follows that the strength of the material is greatly influenced by their presence.

On the other hand coarser glass fibers also play a role in the ability of the AGM separators to serve its many functions. For instance, they improve the wicking rate by creating larger pores.

This mechanical weakness of the AGM separators is even more of a problem in the light of the ongoing development of modern high-performance batteries which are characterized by steadily increasing energy densities and a reduced overall size. Accordingly the distance between the electrodes and therefore the thickness of the separators becomes thinner, further reducing their tensile strength. For an efficient and cost-effective battery production process there is a strong need for thin separators with sufficient tensile strength as to be applicable for high speed processing applications.

In an approach to benefit from both the advantages of fine and coarse glass fibers, multi-layered AGM separators have been proposed. It could be shown that two layers with fine and coarse fibers showed a better tensile strength as if these fibers would have been dispersed in one sheet (Ferreira A. L.; The Multilayered Approach for AGM Separators; $6^{th}$ ELBC, Prague, Czech Republic, September 1998).

U.S. Pat. No. 5,962,161 discloses separators made from a mat of melt-blown ultrafine polymer fibers which may be reinforced with one or more thin layers of spunbond fabric.

U.S. Pat. No. 4,908,282 discloses fibrous sheet separators comprising a mixture of glass fibers and polyethylene fibers.

It also has been suggested to include microporous sheets as part of the separator system in order to control mechanical properties of the separator. An example for this is the use of a layer of microporous polymer material for improving the compression behavior of an AGM separator by arranging the polymer layer between two layers of AGM (Weighall M. J.; ALABC Project R/S-001, October 2000). Favorable compression/recovery properties have been shown to be important since the application of high plate group pressures via a separator having a low compressibility can eliminate premature capacity loss and extend the life of the battery. An example of such a microporous separator is a microporous PVC separator having a mean pore size of 5 $\mu$m and a thickness of 0.57 mm, sandwiched between two layers of AGM with a thickness of 0.52 mm at 10 kPa (Weighall M. J., see above; Lambert U., A study of the effects of compressive forces applied onto the plate stack on cyclability of AGM VRLA batteries, $5^{th}$ ALABC Members and Contractors' Conference Proceedings, Nice, France, Mar. 28–31, 2000).

This separator configuration might provide for improved mechanical properties when compared to AGM separators.

However, the presence of the microporous layer hampers the ionic current between the electrodes, thereby increasing the internal electrical battery resistance. This is disadvantageous for applications which do usually not involve deep discharge cycles, such as starter batteries or stand-by emergency power batteries. Moreover, due to the outer AGM layers these separators are difficult to form into pockets. Moreover, due to the thickness of the polymer membrane these separators are not applicable for spiral wound cells.

SUMMARY OF THE INVENTION

The present invention relates to a battery separator for a lead-acid battery comprising at least one fibrous layer and at least one support layer, wherein said support layer is formed of an acid-resistant material and comprises a plurality of macroscopic openings.

It is the object of the invention to provide a battery separator for a lead-acid battery with improved tensile strength without impairing the oxygen and ion transfer.

It is a further object of the invention to provide a battery separator which can be produced and processed in a cost effective manner.

It is still a further object of the invention to provide an improved valve-regulated lead-acid battery with high electrical power performance.

DETAILED DESCRIPTION OF THE INVENTION

Figure 1:
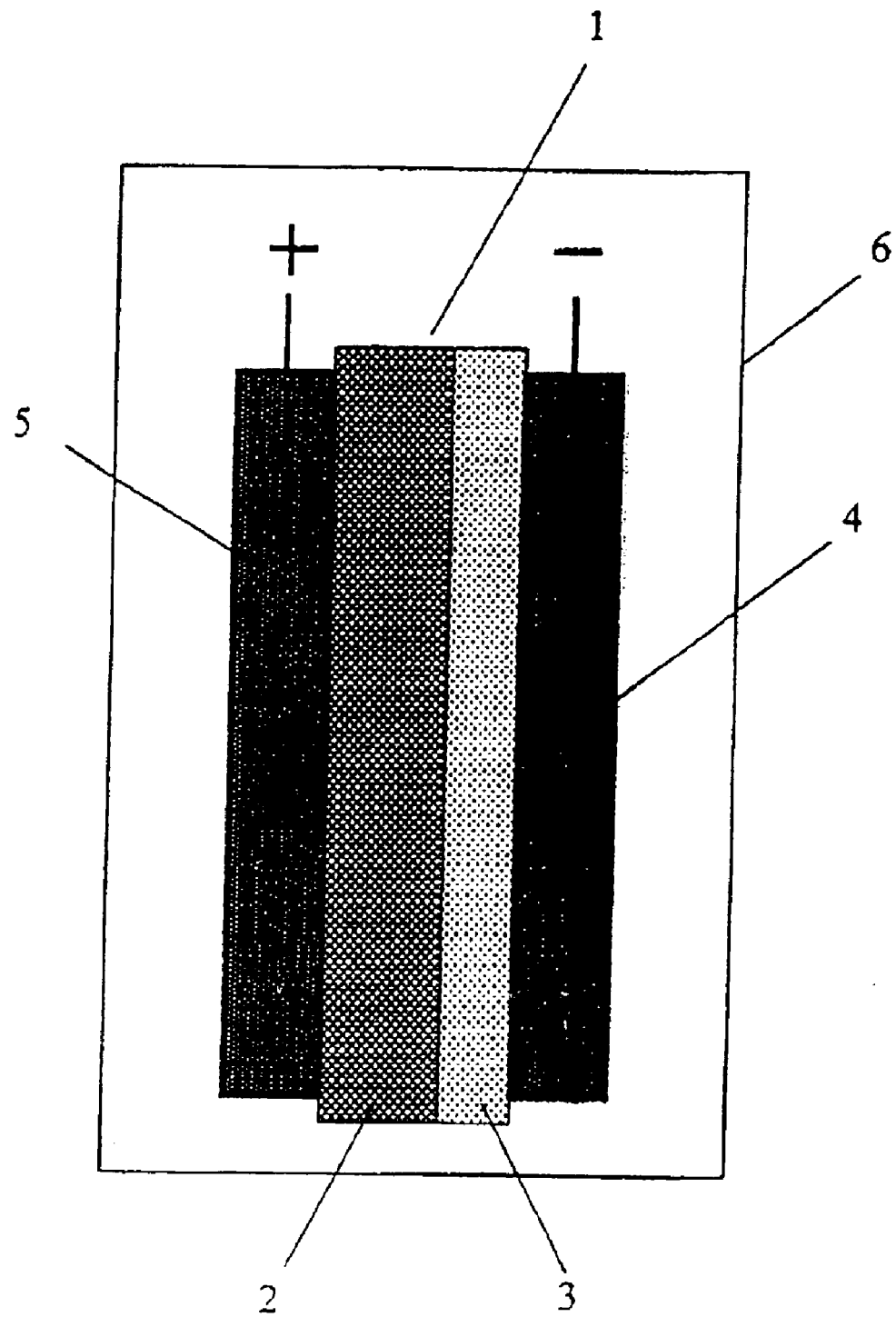
FIG. 1 is a schematic cut through a battery according to the invention.

The present invention is based on the surprising finding that separators with improved tensile strength can be manufactured without impairing oxygen and ion transfer and therefore having a negative influence on the internal battery resistance within a VRLA battery by combining at least one fibrous layer with at least one support layer which is formed of an acid-resistant material and which comprises a plurality of macroscopic openings.

In the context of the present invention openings are holes or apertures in the support layer penetrating the whole thickness of the layer. They thus provide direct ionic transfer through this layer via straight paths extending substantially perpendicular to the extended plane of the layer. For a support layer having the form of a plane sheet this accordingly means that when viewed from above and substantially perpendicular to the plane of the support layer, the layer is seen to contain regions with material and regions without material. The regions without material are the openings. Thus, an opening may be obtained by cutting e.g. a hole in the support layer. The ratio of the total area of the openings to the total area of the layer is defined as the open area of the layer. For instance, for the calculation of the open area of a plane rectangular support layer, the surface of one side of the support layer is given by the product of its height multiplied by its width. The area covered by a single opening can be calculated by taking into account its geometric shape and dimensions. The total area covered by the openings is obtained by adding the areas of all openings.

According to the present invention, the term "macroscopic" is used to designate objects or structures of a sufficient size as to be easily visible to the naked eye. Accordingly, the diameter of a macroscopic opening according to the present invention is preferably larger than 50 $\mu$m, more preferably 100 $\mu$m, and most preferably 1 mm.

To form the separator, the at least one support layer is combined with the at least one fibrous layer thereby mechanically strengthening the latter. According to a preferred embodiment, the separators are formed by laminating one support layer and one fibrous layer. It was found that use of a support layer comprising a certain number of openings and therefore a certain open area ensures that the separator has a sufficient tensile strength for high speed processing applications without negatively influencing the internal electrical resistance of the battery by impairing the ion transport between the electrodes. According to a preferred embodiment the open area corresponds to more than 60% of the surface of one side of the support layer, more preferably to more than 70%, even more preferably to more than 80%, and most preferably to more than 90%. Further, it is preferred that the open area corresponds to less than 99% of the surface of one side of the support layer, more preferably to less than 98%, even more preferably to less than 97%, and most preferably to less than 95%.

While it is possible for the separator of the present invention to comprise more than two layers, e.g., two support layers and a fibrous layer which is sandwiched between the two support layers or vice versa, it is preferred that the separator of the invention comprises only two layers, i.e. one support layer and one fibrous layer.

In the following, embodiments of the present invention will be described in detail with reference to the accompanying drawing. FIG. 1 shows a separator 1 of the present invention. The separator comprises a fibrous layer 2 and one support layer 3. Also shown are the negative electrode 4 and the positive electrode 5 of the battery. The electrodes 4 and 5 as well as the separator 1 are contained in a closed case 6.

The fibrous layer 2 can be made of glass fibers, polymeric fibers or a mixture of glass fibers and polymeric fibers. Suitable mats made of polymer fibers which may be used as fibrous layers in the present invention are disclosed in U.S. Pat. No. 5,962,161, the disclosure of which is incorporated herein by reference.

The preferred material is glass. Generally all glass fiber materials known in the art for producing absorptive glassmat (AGM) separators may be used for forming the fibrous layers of the present invention. A preferred fibrous material are absorptive microfiber glass fleeces without organic components like binder or polymeric fibers. It is preferred that the fibers have a diameter ranging from 0.1 to 10 $\mu$m, more preferably from 0.1 to 5 $\mu$m. The fibers are preferably blends of acid resistant glass fibers of various diameter, usually extremely thin fibers with an average fiber diameter below 1 $\mu$m, referred to as microfibers, and "coarse" fibers with an average diameter of approx. 3 $\mu$m. The microfibers increase the internal surface, improve the tensile strength and decrease the pore diameter, but significantly increase the product cost. The larger fibers facilitate—as mentioned above—the battery filling by creating larger pores with faster acid pick-up.

The fibrous glass layers preferably comprise 20 to 40% by weight of glass microfibers having an average diameter of less than 1 $\mu$m and 60 to 80% by weight of coarse glass fibers having an average diameter of about 3 $\mu$m, for instance 30% by weight microfibers and 70% by weight coarse fibers. Suitable glass fiber mats and the preparation thereof are well known to a person skilled in the art (see for instance B öhnstedt W., in Handbook of Battery Materials, Editor Besenhard J. O., Wiley-VCH, Weinheim 1999, pages 245 to 292 and literature cited therein).

Preferred fibrous layers made of polymer fibers comprise a nonwoven web, mat or fleece of fibers of a diameter of 0.1 to 10 μm, preferably 0.1 to 5 μm. It is preferred that more than 10% by weight of the fibers, more preferably more than 15% by weight of the fibers and most preferably 20 to 40% by weight of the fibers have a diameter smaller than 1 μm, preferably about 0.1 μm, and it is further preferred that at least 60% by weight of the fibers have diameters of less than 5 μm. The fibers are made of a thermoplastic polymer, which is preferably selected from the group consisting of polyolefins, polystyrenes, polyamides, polyesters, halogenated polymers, and the respective copolymers, more preferably polyolefins and in particular polyethylenes and polypropylenes. To render the fibrous layer wettable, a suitable surface active agent is added to the polymer prior to extrusion or hydrophilic groups are covalently bonded to the surface of the fibers after formation. Suitable treatments are described in U.S. Pat. No. 5,962,161, the disclosure of which is incorporated herein by reference. Nonwoven mats of this type can be manufactured by extrusion and blowing processes. One preferred way is described in U.S. Pat. No. 6,114,017, which comprises melting a polymer by polymer heating and extrusion means, extruding said polymer at flow rates of less than 1 g/min/hole through polymer orifices arranged in one or more spaced apart cross directional rows on one or more modular dies heated by a heating unit, wherein the diameters of said orifices may be equal to each other or may differ from row to row to obtain a web comprising fibers of essentially uniform or varying diameter, blowing said polymer extrudate using heated air of at least 95° C. from two or more constant or variable cross-section air jets per polymer orifice, preferably variable cross-section air jets being converging-diverging nozzles capable of producing supersonic drawing velocities, or tempered air between 10° C. and 375° C. of two or more continuous convergin-diverging nozzle slots placed adjacent and essentially parallel to said polymer orifice exits to attenuate said filaments and to produce essentially continuous polymer filaments, and depositing said liberized polymer on a collecting means to form a self-bonded web consisting of as many layers of disbursed continuous polymer filaments as the number of rows of said polymer orifices in said die. U.S. Pat. No. 5,679,379 discloses modular die units suitable for the production of the above nonwoven mats. The disclosure of both U.S. Pat. Nos. 6,114,017 and 5,679,379 is incorporated herein by reference. The self-bonded webs produced in the above process may also be thermally bonded to provide even greater strength by using conventional hot calendering techniques where the calender rolls may pattern engraved or flat. The nonwoven webs, mats or fleeces have low average diameters, improved uniformity, a narrow range of fiber diameters, and significantly higher unbonded strength than a typical meltblown web. When the material is thermally bonded it is similar in strength to spunbonded nonwovens of the same polymer and basis weight.

When a mixture of glass fibers and polymeric fibers is used, the different fibers are preferably used in such proportions that the sheet has an absorbency with respect to the electrolyte of from 75 to 95% in the absence of a surfactant. Preferably the glass and polymeric fibers defined above are used. Fibrous sheets of this type may be prepared by the methods disclosed in U.S. Pat. No. 4,908,282, the disclosure of which is incorporated herein by reference.

The fibrous layer preferably has an average pore size of 3 to 15 μm, more preferably 5 to 12 μm and most preferably 6 to 10 μm.

Unless otherwise stated, all pore sizes as defined herein are measured by the mercury intrusion method described in Ritter, H. L., and Drake, L. C., Ind. Eng. Chem. Anal. Ed., 17, 787 (1945). According to this method, mercury is forced into different sized pores by varying the pressure exerted on the mercury by means of a porosimeter (porosimeter model 2000, Carlo Erba). The pore distribution is determined by evaluation of the crude data with the MILESTONE 200 software. The pore size of the micropores of the polymer layer is measured before forming the holes.

The average pore size is defined as the pore size at which 50% of the total pore volume as determined by the mercury intrusion method is contained in smaller pores and 50% in larger pores.

At a thickness of 0.6 mm at 10 kPa fibrous glass layers typically have a basis weight of 100 g/m$^2$ and a porosity of 93 to 95%. The BET surface area of the fibrous layer is preferably within the range of 0.5 to 2.5 m$^2$/g, more preferably 1.1 to 1.3 m$^2$/g. These and other parameters defined herein are determined according to well established procedures (e.g. BCI Test Methods, BCI/RBSM Standard Test Methods, Battery Council International, Chicago, Ill., USA; if not stated otherwise the thickness of the fibrous layer always refers to the thickness of the dry layer).

Nonwoven webs of polymer fibers, at a thickness of 0.6 mm at 10 kPa, typically have a basis weight of 70 g/m$^2$ and a porosity of 91 to 95%. The BET surface area of the fibrous layer is preferably within the range of 1 to 5 m$^2$/g, more preferably 2 to 3 m$^2$/g. These parameters are determined as described above (e.g. BCI Test Methods).

At a thickness of 0.6 mm at 10 kPa, fibrous sheets comprising a mixture of 85% by weight of glass fibers having a thickness of 0.1 to 10 μm and 15% by weight of polymeric fibers having a thickness of 0.1 to 10 μm, typically have a basis weight of 90 to 95 g/m$^2$ and a porosity of 91 to 95%. The BET surface area of the fibrous layer is preferably within the range of 1 to 3 m$^2$/g, more preferably 1.1 to 2.5 m$^2$/g. These parameters are determined as described above (e.g. BCI Test Methods).

The fibrous layer preferably has a thickness of 0.2 to 3.6 mm, more preferably 0.3 to 1.0 mm. The upper limit for the thickness of the fibrous layer is determined by the desired total thickness of the separator. Separators for starter batteries, which are also referred to as SLI (starting-lighting-ignition) batteries, preferably have a total thickness of 0.6 to 1.8 mm, separators for industrial batteries, such as stationary batteries, of 2 to 4 mm. Instead of a single fibrous layer having a thickness of e.g. 2 mm two or more adjacent fibrous layers having a total thickness of 2 mm may be used. The thickness is determined at 10 kPa using the BCI method (see above).

According to a preferred embodiment of the invention the support layer 3 is basically made of a polymeric material, preferably a filled or unfilled thermoplastic polymer such as polyolefin, poly(vinyl chloride) or other suitable material which is compatible with the battery environment where it is to be used. The polymeric material preferably has the form of a membrane as obtained for example by an extrusion process. Use of a thermoplastic polymer is advantageous in that it simplifies the formation of pockets. The preferred material is polyolefin, such as polypropylene, ethylene-butene copolymer, and preferably polyethylene, more preferably high molecular weight polyethylene, i.e. polyethylene having a molecular weight of at least 600,000, even more preferably ultra high molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

Usually it is preferred that the polymer material is not microporous since microporosity increases the costs and tends to reduce the mechanical strength of the material. However, for support layers with relatively small open areas, microporous materials might be advantageous because they allow ion transfer through the support layer material. In these cases, the micropores of the support layer have an average pore size of less than 1 μm in diameter. Preferably more than 50% of the pores are 0.5 μm or less in diameter. It is especially preferred that at least 90% of the pores have a diameter of less than 0.5 μm. The micropores preferably have an average pore size within the range of 0.05 to 0.5 μm, preferably 0.1 to 0.2 μm.

Microporous polymer support layers preferably comprise a homogeneous mixture of 8 to 100 vol. % of polyoletin, 0 to 40 vol. % of a plasticizer and 0 to 92 vol. % of inert filler material. The preferred filler is dry, finely divided silica. The preferred plasticizer is petroleum oil. Since the plasticizer is the component which is easiest to remove from the polymer-filler-plasticizer composition, it is useful in imparting porosity to the battery separator. The final composition of the separator will depend upon the original composition and the component or components extracted. Materials of this kind are well-known in the art and described for example in U.S. Pat. No. 3,351,495, the disclosure of which is incorporated herein by reference.

Microporous polymer support layers may also be formed of an essentially homogeneous mixture of at least one thermoplastic polymer, preferably ultra-high-molecular-weight (UHMW) polyolefin with an weight-average molecular weight of at least 600,000, at least 20% by volume of pyrogenic silica and optionally one ore more further fillers, preferably precipitated silica, so that the overall filler content is within the range of 60 to 82% by volume, and optionally a plasticizer, preferably a water-insoluble oil and/or process oil. Microporous polymer layers of this type are disclosed in U.S. Pat. No. 6,124,059, the disclosure of which is incorporated herein by reference.

Other preferred materials for microporous polymer support layers are microporous polyethylene films produced by (a) melt extruding at a drawdown ratio of about 20:1 to about 200:1 a polyethylene resin having a density of at least approximately 0.960 g/cm$^3$ and having at least 99% weight ethylene to form an extruded precursor film, (b) annealing said extruded precursor film at a temperature in the range from about 10° C. to 25° C. less than the crystalline melting point of said resin so as to improve the crystallinity of the extruded precursor film and so as to form an unstretched annealed precursor film; (c) uniaxially cold stretching said annealed precursor film at a temperature in the range of from about −20° C. to about 70° C., and at a cold stretching rate of at least 75 percent per minute, based on the length of the unstretched annealed precursor film, to achieve a cold stretched length of from about 120 percent to about 160 percent, said cold stretched length being based on the length of said unstretched annealed precursor film, to form a cold stretched precursor film; (d) hot stretching said cold stretched precursor film, in the same uniaxial direction as said cold stretching, at a temperature in the range of from above the temperature in (c) to a temperature in the range of from about 10° C. to about 25° C. less than the crystalline melting point of the resin so as to maintain the crystallinity of the cold stretched precursor film, and at a hot stretching rate of less than 75 percent per minute, based on the length of said unstretched annealed precursor film, to achieve a hot stretched length of from about 235 percent to about 310 percent, said hot stretched length being based on the length of said unstretched annealed precursor film, so as to form a microporous polyethylene film. Films of this type are described in U.S. Pat. No. 4,620,956, the disclosure of which is incorporated herein by reference.

Also useful as microporous polymer support layer are open-celled microporous polymer films obtained by uniaxially cold stretching a non-porous, crystalline, elastic film at a temperature in the range of between about −20° C. and a temperature 20° C. below the crystalline melting point of the polymeric film; and sequentially hot stretching in the same direction the cold stretched film in a plurality of discrete stretching steps at a temperature in the range of between about 20° C. below the crystalline melting point and 5° C. below the crystalline melting point. Films of this type are described in U.S. Pat. No. 3,843,761 the disclosure of which is incorporated herein by reference.

Further useful as microporous polymer support layer are open-celled microporous polypropylene films obtained by stretching a non-porous crystalline elastic polypropylene starting film having an elastic recovery from a 50 percent extension at 25° C. of at least 20 percent, the polypropylene polymer having a melt index in the range of from about 8 to about 30 and a weight average molecular weight of about 100,000 to 240,000, until an open-celled microporous structure is formed in said film and heat setting the resulting stretched film, to stabilize the open-celled structure in the stretched film. Films of this type are described in U.S. Pat. No. 3,839,240, the disclosure of which is incorporated herein by reference.

Still further suitable as microporous polymer support layer are open-celled microporous polymer films having a reduced bulk density as compared to the bulk density of the corresponding polymer film having no open-celled structure, a crystallinity of above about 30 percent, a pore size of less than 5000 Å, a nitrogen flux of more than 30, a surface area of at least 30 sq.m/cm$^3$ and a breaking elongation of 50 to 150 percent, said open-celled microporous polymer films being obtainable by cold stretching a non-porous, crystalline, elastic film until porous surface regions perpendicular to the stretch direction are formed, the non-porous elastic film having a crystallinity of above about 20 percent, and an elastic recovery from a 50 percent strain of at least 40 percent at 25° C., hot stretching the resulting cold-stretched film until pore spaces elongate parallel to the stretch direction are formed, and thereafter heating the resulting microporous film under tension. Films of this type are described in U.S. Pat. Nos. 3,801,404 and 3,679,638, the disclosure of which is incorporated herein by reference.

Also suitable as microporous polymer support layer are films having a microporous, open-celled structure, an apparent density no greater than about 90 percent of the density of the polymer comprising the film, said polymer having a crystallinity when solid of at least 40 percent and being selected from the group consisting of polyethylene, polypropylene and polyacetal, and said film being characterized by an open-celled structure comprising pore spaces wherein the size distribution of said pore spaces is optimized in the 1000 to 2000 Å range, said film being obtainable by (a) extruding said polymer at a melt temperature no higher than about 100° C. above the crystalline melting point of said polymer, so as to form a film; (b) taking up the resulting film at a drawdown ratio of from 20:1 to about 180:1; (c) rapidly cooling the extruded film while it is being drawn down; (d) annealing the resulting film at a temperature in the range of abut 5 to 100° C. below the crystalline melting point of said polymer for a period of at least 5 seconds in order to develop in the resulting film an elastic recovery from a 50° strain of at least 50 percent at 25° C.; (e) cold drawing the film at a draw ratio of from about 30 percent of about 150 percent of its total length at a temperature no greater than about 200° F. when said film comprises polypropylene, no greater than about 220° F., when said film comprises polyethylene and no greater than about 255° F. when said film comprises polyacetal; (f) heat setting the thus cold drawn film at a temperature of from about 80° C. to about 150° C. while under tension. Films of this type are described in U.S. Pat. No. 3,558,764, the disclosure of which is incorporated herein by reference.

The polymer support layer can be formed as a perforated layer by punching or pricking holes into it, which form the openings, or it can be formed in analogy to the manufacture of expanded metal without material loss by making cuts and subsequently expanding it to have a shape which is equivalent to that of expanded metal. The so formed openings may have a plurality of different shapes and sizes. For instance, the holes can be angular, such as a triangular, square or rhomboidal, round, oval, or elliptical in cross-section. Preferably they are slots or long holes, preferably in horizontal, vertical, or diagonal orientation. Methods and facilities for forming holes and the tools employed therein which usually determine the size and form of the openings are well known to a person skilled in the art.

According to further embodiments of the invention the support layer 3 is constituted by a glass fiber fabric, a polymer fiber fabric, or a fabric composed of a mixture of glass and polymer fibers. Suitable are any kinds of mesh fabrics, i.e., fabrics characterized by open spaces between the glass and/or polymer yarns, wherein these open spaces correspond to the openings of the support layer. Accordingly, the dimensions of the openings are given by the mesh width of the fabric. The mesh fabrics may be manufactured by weaving, knitting, netting or any other kind of method commonly known to those skilled in the art. The preferred material is glass. Generally all glass fiber materials known in the art for producing glass fiber fabrics such as nets of sufficient strength may be used for forming the support layers of the present invention. The glass fibers preferably have an average fiber diameter between 3 and 12 $\mu$m, more preferably between 5 and 9 $\mu$m. Likewise, polymer fiber fabrics used for the preparation of the support layers of the present invention preferably essentially consist of fibers having a diameter larger than 3 $\mu$m or possibly larger than 50 $\mu$m or larger than 100 $\mu$m. Suitable glass fiber and/or polymer fiber nets and their preparation are well known to a person skilled in the art.

In the case of fabrics comprising polymer fibers, it is advantageous that the polymer is a thermoplastic polymer, preferably a polyolefin, and most preferably polyethylene.

According to further preferred embodiments of the invention the support layer 3 is formed by a polymer fiber fleece or mat or a fleece or mat comprising a blend of glass and polymer fibers. In this case the polymer is a thermoplastic polymer. Therefore, upon heating of the fleece the fibers can be fused together at their contact points, thereby increasing the tensile strength of the support layer. It is preferred that the thermoplastic polymer is a polyolefin, most preferably polyethylene. Suitable mats made of polymer fibers which may be used as support layers in the present invention are disclosed in U.S. Pat. No. 5,962,161; suitable fibrous sheets made of glass fibers and polymeric fibers are disclosed in U.S. Pat. No. 4,908,282. The disclosure of both documents is incorporated herein by reference.

It is further possible that the support layer is formed by applying a synthetic resin, such as acrylate resin, epoxy resin, phenol-formaldehyde resin, or other suitable materials which are compatible with the battery environment where it is to be used, directly onto the fibrous layer in form of continuous stripes and subsequent hardening the resin e.g. by photocuring or heat curing.

The size of an opening in a support layer in accordance with the present invention can be characterized by its greatest possible diameter (gpd) which is the maximum possible length of a straight line connecting opposing edges of the opening. For instance, for a quadratic opening the gpd corresponds to the diagonal and for a circular opening to the diameter. The openings of the polymer support layer preferably have a gpd of 1 mm or more, more preferably of 10 mm or more, and most preferably of 30 mm or more. Further, it is preferred that each individual opening of the polymer support layer does not cover more than 30% of the surface of the support layer, more preferably not more than 10%, even more preferably not more than 2%, and most preferably not more than 1%.

The openings are preferably spaced apart 0.01 to 5 mm, i.e. the minimum distance between two openings is preferably within the range of 0.01 to 5 mm independent of the direction. The openings may be arranged aligned or alternately or randomly distributed. For the most preferred embodiment comprising an open area in excess of 90%, the openings are accordingly formed in closely spaced relation and separated only by thin land areas of material. While the openings may be arranged in any regular or irregular pattern, it is advantageous that the openings are arranged in rows extending parallel to the lateral edges of the separator. This provides for continuous land areas of material inbetween these rows which extend across the entire length of the separator and in the direction of predominant tensile stress during high speed processing of the separator product which is usually supplied in rolls to the battery manufacturer.

The openings ensure an efficient oxygen cycle within the battery and a largely unimpaired ion transfer between the electrodes thereby effecting a low internal electrical resistance.

The thickness of the support layer is preferably within the range of 0.01 to 1 mm, preferably within the range of 0.02 to 0.3 mm and most preferably about 0.2 mm. For the preferred embodiment of the invention (combination of one fibrous layer and one support layer) the fibrous layer of a separator for starter batteries thus preferably has a thickness of 0.2 to 1.2 mm, more preferably of 0.3 to 1.0 mm. For an industrial battery the thickness of the fibrous layer is preferably within the range of 1.4 to 3.5 mm, more preferably 1.5 to 2.0 mm.

The separators of the present invention can be provided in sheet form. Separators of the present invention which comprise support layers containing polymer material can also be provided in the form of a pocket with an open top, a closed bottom and closed sides. In these cases, it is preferred that at least two opposing edge regions of the support layer are not covered by the fibrous layer to provide edges for sealing, e.g. sealing with an adhesive, heat sealing or for full edge ribbon sealing for spiral wound cells. The manufacture of such pockets is well known to a person skilled in the art. It was found that these separators of the present invention can be easier formed into pockets than multilayer separators according to the prior art comprising two outer AGM layers. It is also possible to form the separator by firstly placing a fibrous layer on top of a support layer which has more than twice the width than the fibrous layer. In this step the fibrous layer is arranged to be located completely on a first half of the support layer and such that an edge region of this first half is not covered by fibrous layer. In a subsequent step the second half of the support layer is folded over the first half and the fibrous layer located on top of it, in such a manner that the edge regions of the support layer are located against each other. Thereby, these edge regions provide for the possibility of sealing, e.g. heat sealing, to form a tube of support layer material containing the fibrous layer.

The separators of the invention can also be formed by laminating at least one support layer and at least one fibrous layer. The various layers can be bonded together by glueing, ultrasonic sealing or sewing. Preferably an adhesive such as an acrylate or polyethylene hot melt is used to improve bonding between the support layer and the fibrous layer. The adhesive is preferably applied between the layers of the separator in form of individual spots or continuous stripes. The manufacture of such laminates is well known to a person skilled in the art.

The separators of the present invention can be prepared and processed at considerably lower costs than separators according to the prior art based on pyrogenic silica or AGM with a very high portion of microfibers. Moreover, further savings are possible by using a non-porous support layer. In addition, due to their increased tensile strength they can be processed at higher speeds than common AGM and other fibrous layer separators and thus significantly accelerate the manufacture of lead-acid batteries, for example for spiral wound cells. During the manufacture of the latter the separator is unrolled from a roll having a large moment of inertia by pulling at the separator leading to high tensile stress. Further, they provide for easy sealability. Besides improved tensile strength the separators of the invention show good oxygen and ion transfer properties which help to prevent premature failure and a low internal electrical resistance of the battery for high power performance, and they are thin so that they are useful for manufacturing batteries with high power densities, for example starter batteries. Moreover, the support layers improve the compressive properties of the separator and ensure a more uniform compression.

The invention further pertains to a valve-regulated lead-acid battery comprising at least two oppositely charged electrodes in a closed case, a body of an electrolyte and a separator between adjacent ones of said electrodes, wherein said separator is a separator as defined above. The electrolyte is preferably totally absorbed by the separator and the electrode plates. Preferably, the batteries are used in applications like for starting combustion engines or in stand-by applications and not in applications in which they are subjected to frequent deep discharge cycles and which therefore involve a high risk of short circuit formation.

The invention will be more fully understood from the following examples, which are presented solely for the purpose of illustration, and are not to be construed as limiting.

EXAMPLE 1

A rectangular silica-filled UHMW polyethylene membrane having a height of 270 mm, a width of 165 mm, and a thickness of 0.2 mm was laminated to a glass fiber layer. The polyethylene used in this example had an average molecular weight of 7 million, a standard load melt index of 0, and a viscosity number of 3000 ml/g. The silica used as filler material was finely divided silica ("HiSil 233") having an average particle diameter of about 0.02 $\mu$m and a surface area of 165 m$^2$/g. The membrane was composed of 50 vol. % polyethylene and 50 vol. % silica and had a average pore diameter of 0.1 $\mu$m.

The polyethylene membrane was punched with a customary tool in order to form a regular pattern of parallel long holes. The holes had a width of 11 mm and were spaced 0.3 mm apart in a direction perpendicular to the longitudinal axis of the hole. Along each of the four edges of the membrane a region of 4 mm width was left unperforated, thereby defining an inner region. The pattern of long holes was arranged so that it covered the inner region, wherein the longitudinal axes of the long holes were extending in parallel to the sides of the rectangular membrane. Thereby the open area was 90%–91%.

The glass fiber layer was made of about 35% by weight of glass fibers having a thickness of up to 1 $\mu$m and about 65% by weight of glass fibers having a thickness of about 3 $\mu$m. The fiber layers had a porosity of 95%, an average pore size of 12 $\mu$m and a BET surface area of 1.1 m$^2$/g (Hovosorb™ BG 1305; Hollingsworth & Vose Co.).

The glass fiber layer had a thickness of 0.86 mm at 10 kPa. Lamination was achieved by a stripe of adhesive (acrylate glue; Rhoplex™ N-495). The final two-layer separator had a thickness of 1.1 mm (at 10 kPa) and a size of about 270 mm×165 mm.

It is possible to form this separator into a pocket by folding the bottom half of the separator over the top half and subsequently heat sealing the left and right outer edges. The resulting pocket separator comprises an open top, a closed bottom, and closed sides, and has a height of 135 mm and a width of 165 mm.

EXAMPLE 2

A battery separator was produced by the procedure of Example 1, except that two polyethylene membranes were laminated with the glass fiber layer. The glass fiber layer was sandwiched between the polyethylene membranes. The three-layer separator has a thickness at 10 kPa of 1.3 mm.

What is claimed is:

1. A battery separator comprising at least one fibrous layer comprising a mixture of glass fibers and polymeric fibers and at least one support layer, wherein said support layer is formed of an acid-resistant material and comprises a plurality of macroscopic openings having diameters larger than 1 mm and penetrating the whole thickness of said support layer providing direct ionic transfer through said support layer via straight paths extending substantially perpendicular to the extended plane of said support layer.

2. A battery separator according to claim 1, wherein the fibrous layer has an average pore size of 3 to 15 $\mu$m.

3. A battery separator according to claim 1, wherein the fibrous layers comprise glass fibers having a diameter of 0.1 to 10 $\mu$m.

4. A battery separator according to claim 3, wherein the glass fibers have diameters ranging from 0.1 to 5 $\mu$m.

5. A battery separator according to claim 1, wherein the fibrous layers comprise polymeric fibers having a diameter of 0.1 to 10 $\mu$m.

6. A battery separator according to claim 5, wherein the polymeric fibers have diameters ranging from 0.1 to 5 $\mu$m.

7. A battery separator according to claim 1, wherein the polymeric fibers are polyolefin fibers.

8. A battery separator according to claim 7, wherein the polyolefin is polyethylene and/or polypropylene.

9. A battery separator according to claim 1, wherein the fibrous layer has a thickness of 0.2 mm to 3.6 mm.

10. A battery separator according to claim 1, wherein the openings of the support layer cover more than 60% of the surface of the support layer.

11. A battery separator according to claim 10, wherein the openings of the support layer cover more than 70% of the surface of the support layer.

12. A battery separator according to claim 11, wherein the openings of the support layer cover more than 80% of the surface of the support layer.

13. A battery separator according to claim 12, wherein the openings of the support layer cover more than 90% of the surface of the support layer.

14. A battery separator according to claim 1, wherein the openings are spaced apart 0.01 to 5 mm.

15. A battery separator according to claim 1, wherein at least two opposing edge regions of the support layer are not covered by the fibrous layer to provide edges for sealing.

16. A battery separator according to claim 1, wherein the openings of the support layer have the form of slots or long holes.

17. A battery separator according to claim 1, wherein the support layer has a thickness of 0.01 to 1 mm.

18. A battery separator according to claim 1, wherein the separator has the form of a pocket with an open top, a closed bottom and closed sides.

* * * * *